United States Patent
Carlsson et al.

(10) Patent No.: US 7,627,336 B2
(45) Date of Patent: Dec. 1, 2009

(54) POWER CONTROL FOR HIGH SPEED PACKET DATA TRANSMISSION

(75) Inventors: Roland Carlsson, Ojersjo (SE); Torbjorn Karlsson, Lindome (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 693 days.

(21) Appl. No.: 10/596,730

(22) PCT Filed: Dec. 22, 2003

(86) PCT No.: PCT/SE03/02053

§ 371 (c)(1),
(2), (4) Date: Jun. 22, 2006

(87) PCT Pub. No.: WO2005/062489

PCT Pub. Date: Jul. 7, 2005

(65) Prior Publication Data

US 2007/0111745 A1   May 17, 2007

(51) Int. Cl.
*H04B 7/00* (2006.01)
*H04B 1/00* (2006.01)
*H04B 7/185* (2006.01)

(52) U.S. Cl. .................... 455/522; 455/69; 370/318
(58) Field of Classification Search ............ 455/522, 455/69; 370/318
See application file for complete search history.

(56) References Cited

U.S. PATENT DOCUMENTS

| 5,924,043 A * | 7/1999 | Takano | 455/522 |
| 5,982,760 A * | 11/1999 | Chen | 370/335 |
| 6,628,924 B1 * | 9/2003 | Miyamoto | 455/69 |

(Continued)

FOREIGN PATENT DOCUMENTS

EP   1351411 A1   10/2003

(Continued)

OTHER PUBLICATIONS

Swedish Patent Office, International Search Report for PCT/SE2003/002053, dated Jul. 16, 2004.

*Primary Examiner*—Matthew D Anderson
*Assistant Examiner*—Bobbak Safaipour
(74) *Attorney, Agent, or Firm*—Roger S. Burleigh

(57) ABSTRACT

A transmitting unit comprising a first unit (CM_SCHDR) receiving scheduled first data (DATA2, DATA3) for transmission on at least a first channel, a power control unit (PWR_CTRL) for the first channel responsive to a respective closed loop power regulation signal (TCP_CMD), under which at least the transmit power rate of change is limited to a predetermined value per time unit, a packet data scheduler (HS_SCHDR) scheduling second data packets (DATA1), such as HSPDA data, for transmission on at least a second channel at an actual power level (P_H(t)), and a power amplifier (POWER_AMP) amplifying and outputting the scheduled first and second data, whereby the outputted first and second channels are subject to interference from one another, is shown. A possible power (P_POS(t)) is determined at a given instance as the maximum value of either the actual power (P_HS(t−1)) at a previous instance or the possible power determined at a previous instance (P_POS(t−1)), decreasing the maximum value by a predetermined value (d). Moreover, a permitted power (P_PERM(t)) at a given instance as the maximum value of either the actual power of a previous instance (P_HS(t−1)) added with the predetermined value (d) or the determined possible power (P_POS(t)). Finally, the scheduling is performed within these limits.

7 Claims, 8 Drawing Sheets

U.S. PATENT DOCUMENTS

| | | | |
|---|---|---|---|
| 6,985,751 B2 * | 1/2006 | Bartl et al. | 455/522 |
| 7,069,035 B2 * | 6/2006 | Chen et al. | 455/522 |
| 7,082,108 B2 * | 7/2006 | Hwang et al. | 370/311 |
| 7,532,595 B2 * | 5/2009 | Nibe | 370/329 |
| 7,551,589 B2 * | 6/2009 | Kim et al. | 370/335 |
| 7,561,637 B2 * | 7/2009 | Jonsson et al. | 375/316 |
| 2002/0036996 A1 * | 3/2002 | Ozluturk et al. | 370/335 |
| 2002/0196766 A1 * | 12/2002 | Hwang et al. | 370/342 |
| 2003/0108013 A1 * | 6/2003 | Hwang et al. | 370/335 |
| 2003/0125068 A1 | 7/2003 | Lee et al. | |
| 2004/0258024 A1 * | 12/2004 | Tiedemann et al. | 370/332 |

FOREIGN PATENT DOCUMENTS

| | | |
|---|---|---|
| WO | WO 03/058988 | 7/2003 |

* cited by examiner

POWER CONTROL FOR HIGH SPEED PACKET DATA TRANSMISSION

FIELD OF THE INVENTION

The present invention relates to power control in communications systems in particular in code division multiplex access (CDMA) systems such as UMTS systems (W-CDMA). More particularly, the present invention relates to aspects of high-speed packet downlink packet access communication (HSPDA).

BACKGROUND

As is well known, in wide band direct sequence CDMA systems signals consist of different pseudo-random binary sequences that modulate a carrier. Thereby, the spectrum of the signals is spread over a wide frequency range common to a number of channels in the system. Due to the direct sequence coding, orthogonality between signals is achieved, enabling individual decoding of signals from the common frequency range.

This coding principle has many advantages. For instance, direct sequence spread spectrum coding provides substantial reductions of the severity of multi-path fading, which leads to an effective utilization of spectrum resources.

Since signals occupy the same space in the frequency/time domain, power regulation of the individual channels is an important aspect of CDMA systems.

CDMA systems employ power control on both the up- and the downlink. One objective of the power control is to regulate each mobile station transmitter operating within the cell site base-station receiver, such that the signals have the same power level at the base-station receiver regardless of the position or propagation loss of the respective mobile stations. It should be noted that the power level is proportional to the transmission data rate.

When all mobile station transmitters within a cell site are so controlled, then the total signal power at the base-station receiver is equal to the nominal received power times the number of mobile stations.

Each selected signal received at the base-station is converted into a signal that carries the narrowband digital information, whereas the other signals that are not selected constitute a wide band noise signal. However, the bandwidth reduction, which is performed according to the decoding process, increases the signal-to-noise ratio from a negative value to a level that allows operation with an acceptable bit error rate.

The overall system capacity, for instance the number of users that can operate within the cell simultaneously, depends on the minimum signal-to-noise ratio, which produces the given acceptable bit error rate.

On the downlink, the cell also supports power regulation by adjusting the downlink power for each signal to the respective mobiles in response to their requests. The purpose is to reduce power for units that are either stationary, relatively close to the cell site, impacted little by multi-path fading and shadowing effects, or experiencing little other cell interference. Thereby, the overall noise level diminishes and those mobiles being in a more difficult environment will benefit.

The current 3rd Generation Partnership Project (3GPP) specification for third generation mobile telephony system, also denoted UMTS, supports different user data rates for different users. The transmitted downlink power for a given user entity is determined by the interference level in the actual cell, the prevalent channel quality, the user data rate, and the requested quality of service for the data transmission.

In UMTS systems there are two basic kinds of physical channels that are used for transmission: Dedicated channels and common channels. Only one user at a time may use a dedicated channel, whereas many users can share a common channel.

Normally, the downlink interference for a particular user entity stems from a plurality of transmissions of relatively low power to other user entities (on other orthogonal channels). The interference originates from adjacent base stations as well as the very base station or base stations, in case of soft handover, from which the user entity in question receives a transmission.

A transmit power control (TPC) loop is used for dedicated channels. The purpose of the TPC loop is to regulate the downlink power for individual user entities so that the ratio between received power and the interference is held constant even though the absolute value of the interference fluctuates. Thereby, a desired user downlink data transmission quality can be obtained.

The TPC loop makes use of TPC commands that are forwarded from the user entity to the base station once per slot (1 slot corresponds to 0.67 ms). The TPC command may either 'raise the power' or 'lower the power' in steps. The power step adjustment for each command is normally 1 dB. This means that the TPC loop can adjust the transmission power 1 dB per slot at the most. Thereby, the power transmitted from the base station will vary over time due to variations in interference level from other sources and variations in channel quality. The utilization of the TPC loop will result in a relatively constant interference level for the individual user entity in question.

Recently, a new downlink service, High Speed Downlink Packet Access (HSDPA), has been introduced in 3GPP. A brief account of the operating principle can be found in "Performance Aspects of WCDMA Systems with High Speed Downlink Packet Access HSPDA)", by T. E. Kolding, et. al.

The HSPDA transmission makes use of a 2 ms transmission time interval (three time slots), adaptive modulation and coding (AMC) multimode transmissions, such as QPSK and 16 QAM modulations, fast physical layer (L1), hybrid automatic request (H-ARQ). The scheduler is transferred from the radio network controller to the so-called Node B, also denoted base station set, BSS. In FIG. 6, an outline has been given, indicating the data transmissions, up-link power control and downlink power control to various user entities, UE's.

FIG. 1 shows the major channels utilized in HSPDA.

On the downlink side there is provided: Several common data channels 1. A dedicated signal radio bearer 2 for each user using HSPDA transmissions; a common channel for control signaling 3, a number of common user data channels 4-5, which are allocated HSPDA data in a flexible manner.

On the uplink side there is provided: a dedicated channel for, among other things, providing channel quality information, CQI, and HSPDA automatic request signaling, H-ARQ, 6, an uplink dedicated channel associated with each HSPDA user comprising both control information and data, 7.

With the introduction of High Speed Downlink Packet Access (HSDPA) in UMTS systems, the interference level will not longer fluctuate in a slowly manner. Large momentary interference steps of several dB's will appear when the HSDPA channel turns from no data transmission to maximum data rate transmission. Other mobile stations will experience performance degradations around the time of initiation of the high power HSPDA transmission. This problem is often described as the 'flashlight effect problem'.

In FIG. 2, an exemplary scenario for the downlink interference level has been depicted for a typical user entity. The user entity experiences a certain level of thermal noise, N_TH. Also interference from downlink channels of adjacent cells, I_ADJ. Moreover, non-HSPDA inference from other downlink channels in the cell in which the given user entity resides, I_NON_HSPDA_CELL, also contributes to the interference level. The latter level is often of a considerable level, in relation to the two first mentioned sources. Finally, the interference from non-regulated HSPDA transmissions is shown, I_HSPDA_CELL. As mentioned above, these transmissions may be of a high magnitude and may change abruptly.

In FIG. 3, the HSPDA transmission of FIG. 1 corresponding to the used HSPDA power in Node B has been shown, further.

In FIG. 4, the sum, D_PWR, of the interference contributions of FIG. 2 has been depicted for an unregulated HSPDA transmission. The given actual dedicated channel power is denoted A_PWR. Since the TCP caters for a maximum change of 1 dB/0.67 ms, the prevalent signal to interference level, S/I_1, may decrease below the given minimum detection threshold on rising flanks of the HSDPA generated interference.

SUMMARY OF THE INVENTION

It is a first object of the invention to avoid packet data transmissions interfering with at least a prioritized dedicated channel, while optimizing packet throughput This object has been accomplished by the transmit unit defined by claim 1 and the method defined by claim 7, respectively.

It is a further object of the invention to set forth a transmitting unit avoiding interference in connection with HSPDA transmissions.

This object has been accomplished by claim 6.

Further objects and advantages will appear from the following detailed description of the preferred embodiments of the invention.

DETAILED DESCRIPTION OF PREFERRED EMBODIMENTS OF THE INVENTION

According to a first embodiment of the invention, a downlink CDMA channel used for HSPDA transmissions is subject for power control and scheduling with the aim of preventing flashlight effects.

As mentioned above, the downlink transmit power on dedicated non-HSPDA channels are regulated according to a closed loop (TPC) regulation depending on the reception conditions of the mobile station in question, according to which regulation at least the permitted transmit power rate of increase is limited to a predetermined first value per time unit. In CDMA systems, the terminals may request an increase or decrease in the downlink transmit power of 1 dB per time slot, that is, at a maximum rate of 1 dB/0,67 ms.

Depending on the actual system, another rate may pertain.

High-speed packet data transmission has the property of not being restricted of TPC loop considerations.

HSDPA is a service where Node B (the base station) determines the amount of data to be transmitted as well as used transmission power. The amount of data to be transmitted is a function of available transmission power. There is a new HSDPA transmission every third slot (=2 ms).

The functions of Node-B are: Air interface Transmission/Reception; Modulation/Demodulation; CDMA Physical Channel coding; Micro Diversity; Error Handing; Closed loop power control (TPC).

The functions of the RNC are: Radio Resource Control; Admission Control; Channel Allocation; Power Control Settings; Handover Control; Macro Diversity; Ciphering; Segmentation/Reassembly; Broadcast Signaling; Open Loop Power Control.

Figure 1:
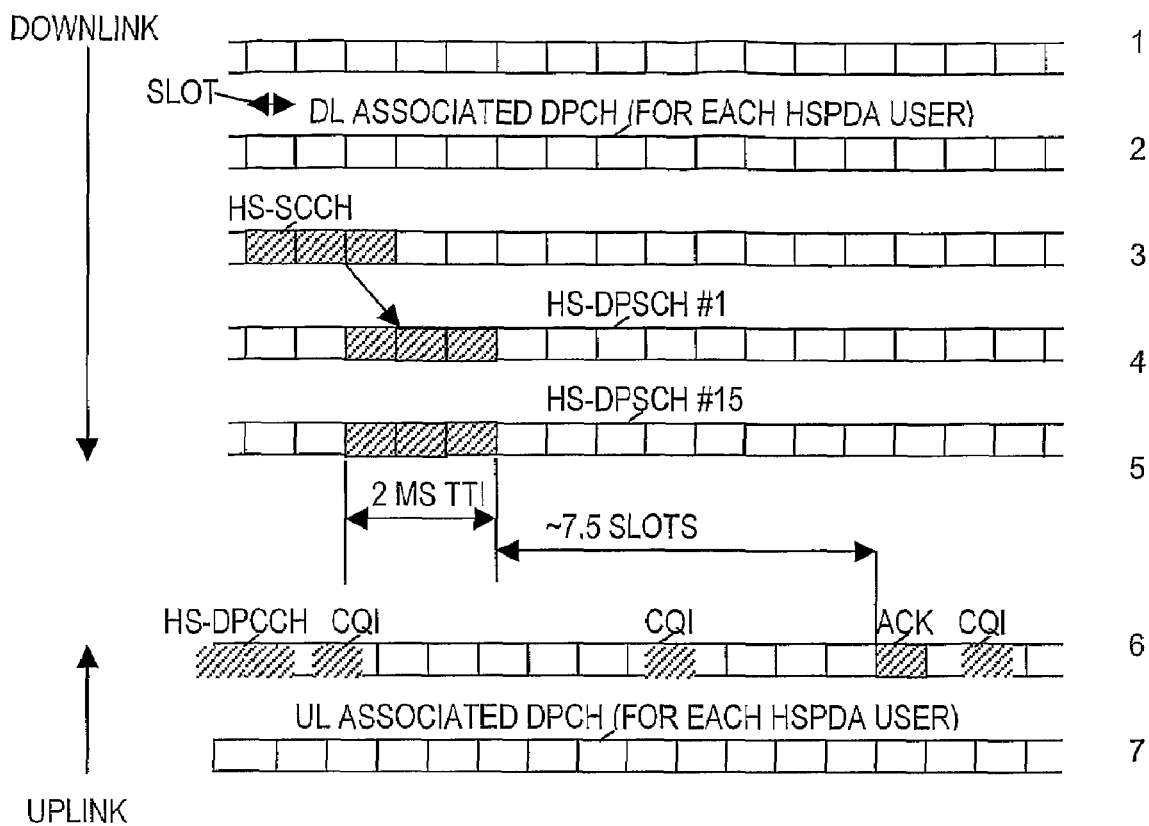
FIG. 1 shows the main channels utilized in HSPDA.
Figure 5:
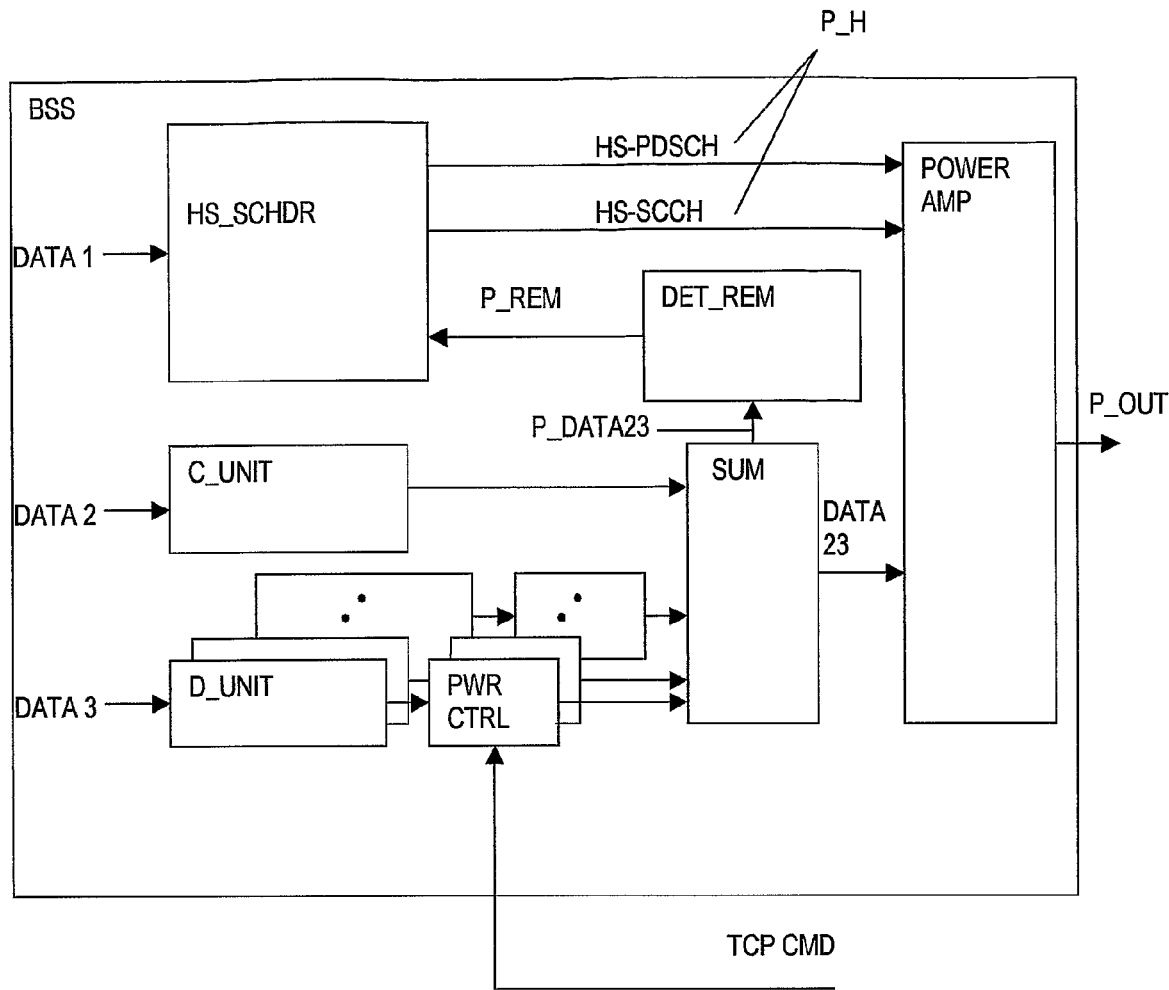
Figure 6:
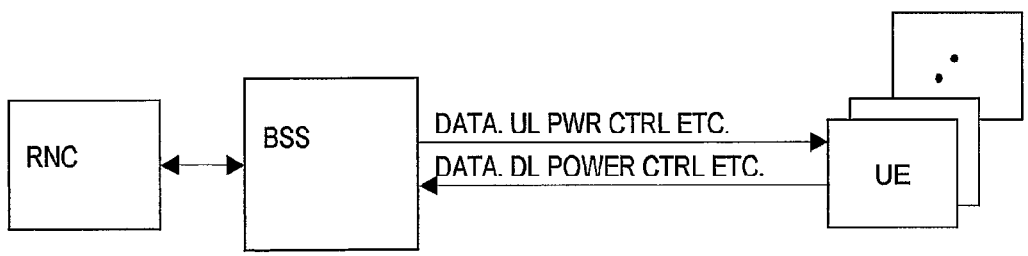
FIG. 6 shows a mobile communication system, FIG. 7 discloses a packet data scheduler according to a preferred embodiment of the invention.

In FIG. 5, an exemplary embodiment of the transmission unit according to the invention is shown, BSS. The transmission unit comprises a number of dedicated channel units, D_UNIT, a number of corresponding power control units, PWR_CTRL, a summing stage, SUM, a common channel unit, C_UNIT. Common channel data, DATA2, cf. channel 1 in FIG. 1, and dedicated channel data, DATA3, cf., channel 2 in FIG. 1 are summed in summing stage SUM and output, DATA23 to power amplifier stage POWER_AMP at outlet P_OUT.

According to one embodiment of the invention, the respective common and dedicated units C_UNIT and D_UNIT, receives scheduled data, DATA2 and DATA3, respectively, which is scheduled by other standard units or node (not shown) and perform physical layer channel coding. The actual scheduling may alternatively be performed in the units C_UNIT and D_UNIT.

The respective power control unit, PWR_CTRL, for the respective dedicated channel is responsive to a respective closed loop power regulation signal, TCP_CMD, under which at least the transmit power rate of change is limited to a predetermined value per time unit.

The power amplifier, POWER AMP, amplifies and outputs the scheduled first and second data, whereby the outputted first and second channels are subject to interference from one another.

Each respective power control unit is responsive to respective closed loop power request commands (TCP_CMD) from the individual user entities.

The summing stage, SUM, reports a signal, P_DATA23, indicative of the power level of the outputted power of signal DATA23, which is provided to a remaining power determination stage, DET_REM.

Since the output power, P_OUT may be limited by a regulatory level or at least limited by physical restrictions of the power amplifier; there is a finite power level budget available for the total transmission, P_OUTMAX. Since the dedicated channels and the common channels, DATA2 and DATA3, have a higher priority, due to the their function of providing for voice and control signaling, a signal P_REM is defined as P_OUTMAX-P_DATA23, indicative of the remaining power being available after scheduling and power assignment of the common and dedicated channels. This signal is provided from remaining power determination stage DET_REM and delivered to HSPDA scheduler, HS_SCHDR.

The HSPDA scheduler encodes and schedules HSPDA data, DATA1, according to the routines provided by the invention, into channels HS_PDSCH and HS_SCCH, whose summed power level is denoted P_H.

Figure 7:
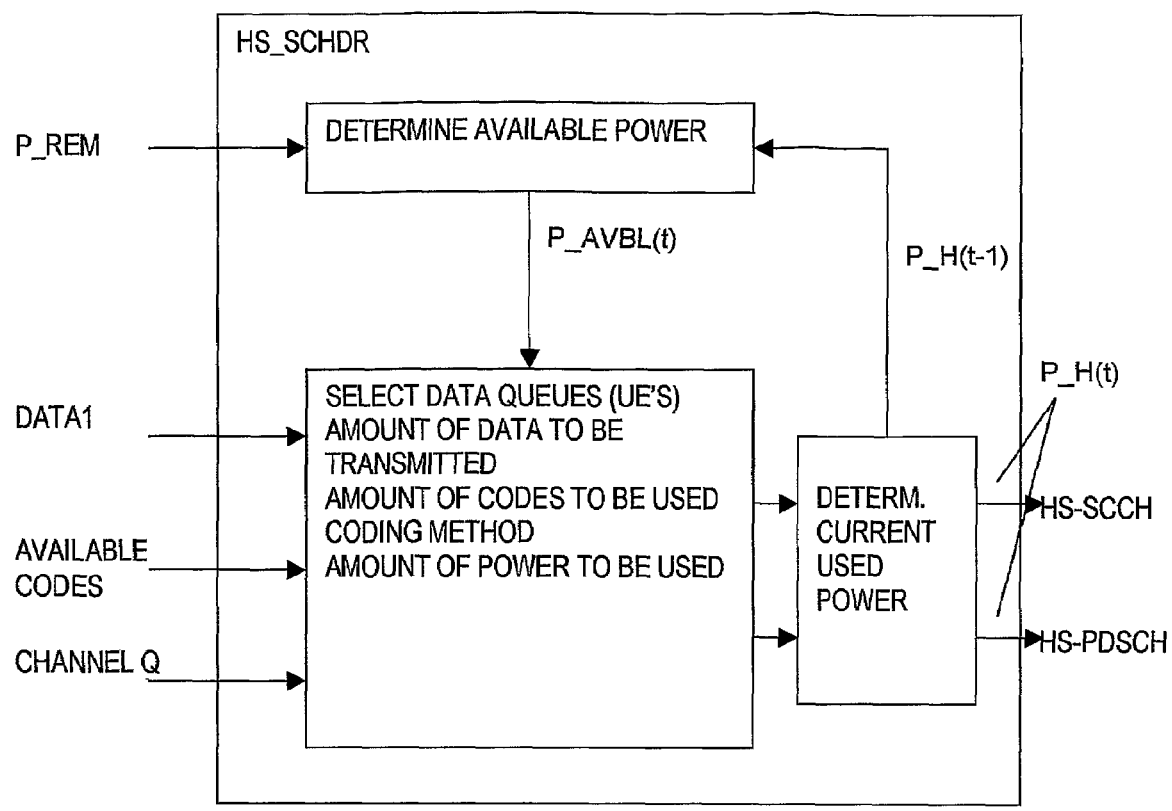

In FIG. 7, the HSPDA scheduler is represented. As mentioned above, the actual power level $P\_H(t)$, of a scheduling instance t relates to the issued power of the HSPDA transmission. The previous value of the actual power level $P\_H(t-1)$ is stored from a precedent instance.

Moreover, an available power level, $P\_AVBL(t)$, is calculated by the scheduler.

According to the shown embodiment, the available codes available for channel coding may be provided from an external source as well as the channel quality, Q.

Based on the amount of HSPDA data available at a given instance, DATAI, the available codes and the indicated quality level for the HSPDA transmission, the scheduler HS_SCHDR determines the desired power for the HSPDA transmission at a given current scheduling instance.

The routines according to the invention for this determination shall be explained in more detail in the following, with reference to FIG. 8.

The transmit unit, BSS, for each scheduling interval of high-speed packet data operates the packet data scheduler, HS_SCHDR, to carry out the following steps:

1—for each scheduling interval,

2—the dedicated and common units receive scheduled first data, DATA2, DATA3, pertaining to the common and dedicated channels, 3—the transmit unit determines the remaining power $P\_REM(t)$, by means of the unit DET_REM, 4—a measure, denoted the possible power $P\_POS(t)$, is determined as the maximum value of either the actual power $(P\_HS(t-1))$ at a previous instance or the possible power determined at a previous instance $(P\_POS(t-1))$, decreasing the maximum value by a predetermined value (d); in other words $P\_POS(t) := MAX[P\_H(t-1), P\_POS(t-1)]-d$, 5—a measure, denoted the permitted power $P\_PERM(t)$, is determined at a given instance as the maximum value of either the actual power of a previous instance $(P\_HS(t-1))$ added with the predetermined value (d) or the determined possible power $(P\_POS(t))$; in other words $P\_PERM(t) := MAX[P\_H(t-1)+d, P\_POS(t)]$, 6—the available power $P\_AVBL(t))$ is determined as the minimum value of either the permitted power or the remaining power $(P\_REM(t))$; in other words $P\_AVBL(t) := MIN[P\_PERM(t), P\_REM(t)]$, 7—finally the scheduler schedules the high speed packet data in dependence of the prevalent amount of incoming high speed data according to the available codes and the channel quality in such a way that the output power $P\_H(t)$ is lower or equal to the determined available power $P\_AVBL(t)$.

If the HSPDA transmission has just been initiated the value of $P\_H(t-1)=0$ and $P\_POS(t-1)=0$. In UMTS systems the value d is selected to a value about 3 dB when the TPC step is set to 1 dB. Each scheduling instance has a duration of TTI=2 ms.

It is noted that the step of determining the remaining power can be done at any time before step 6.

According to the above embodiment of the invention, the power difference between two consecutive HSDPA transmissions are restricted in such a way that the used power for HSDPA channels is ramped up so slowly that the TPC loops for the dedicated channels can handle the power rise. By limiting the increment of used transmission power between two HSDPA transmissions, the interference increment will be limited. Thereby, the transmissions of the dedicated channels remain undisturbed. Moreover, the HSPDA power is regulated after a preceding HSPDA transmission in such a way that it benefits from the downward slope of the TPC restricted dedicated channels, thereby enhancing HSPDA throughput.

Figure 8:
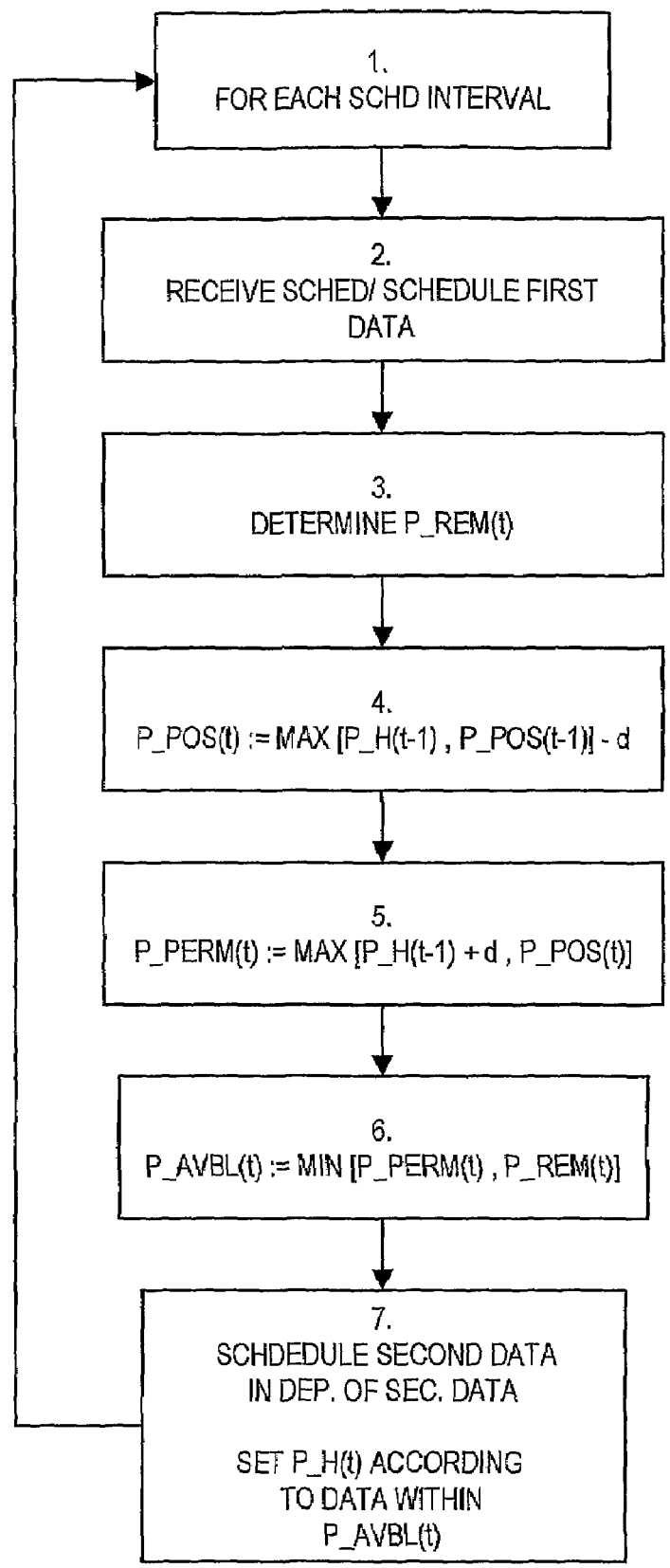
FIG. 8 shows a preferred routine according to the invention.

According to a further embodiment of the invention, illustrated in FIG. 8, the transmit unit BSS for each scheduling interval of high speed packet data, DATA1, operates the high speed packet data scheduling according to steps 1-5 and regulates the actual power $P\_H(t)$ within the permitted power $P\_PERM(t)$ instead of the available power.

The functionality and the effects of the invention shall now be dealt with having reference to FIGS. 9-13, which relates to a given fictive exemplary scenario for incoming packet data, DATA1, utilizing the regulation as depicted in FIG. 8.

At scheduling instance t=A, it is imagined that the HSPDA packet data has been transmitted for some time at a fairly constant power level $H(t)$ and that the dedicated channels are in balance with the HSPDA level as denoted by $P\_H(t)$.

Figure 9:
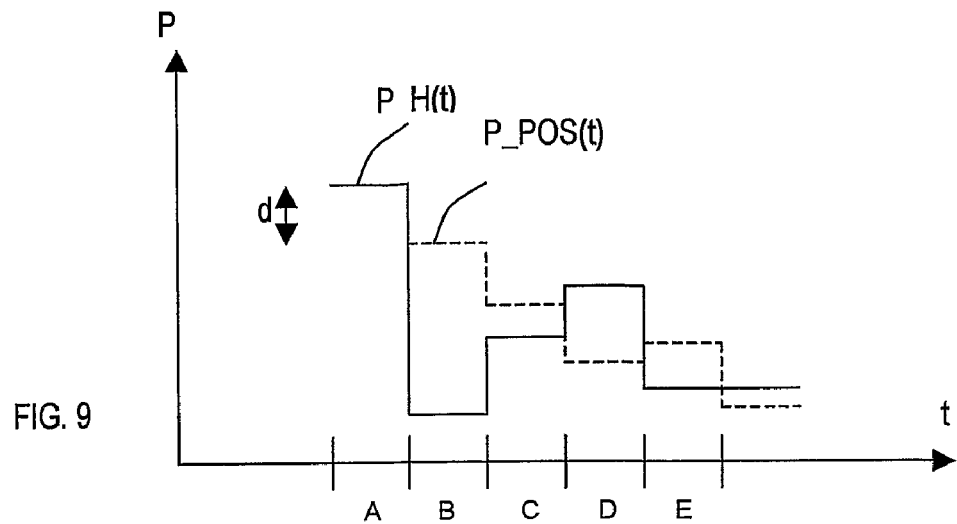
FIG. 9-13 shows the functionality and the effects of the invention for a given fictive exemplary scenario for incoming packet data.

In FIG. 9, the possible power $P\_POS(t)$ is calculated according to step 4.

Figure 10:
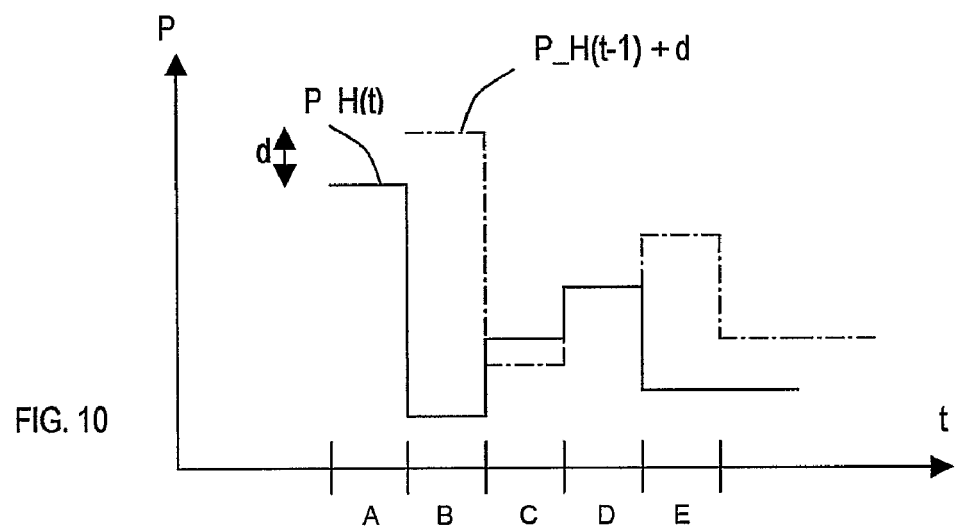

In FIG. 10, for reasons of illustration, the power level used in the preceding scheduling instance $P\_H(t-1)$ added by the constant d has been shown.

Figure 11:
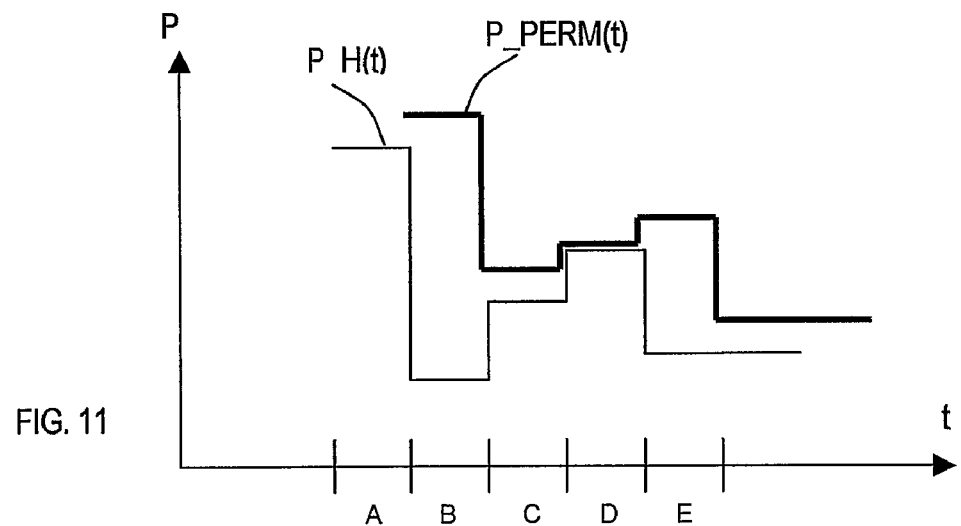

Hence, P_Perm as defined in step 5 can be graphically found by the maximum value of $P\_H(t-1)+d$ in FIG. 10 and $P\_POS(t)$ in FIG. 9. $P\_PERM(t)$ is depicted in FIG. 11.

Figure 12:
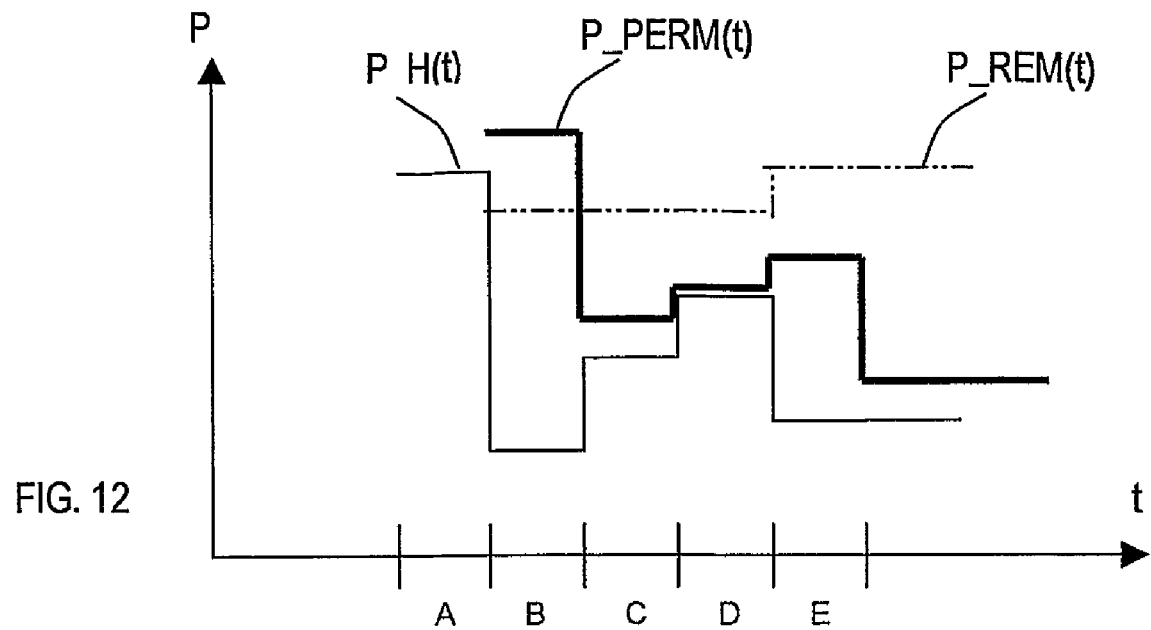
Figure 13:
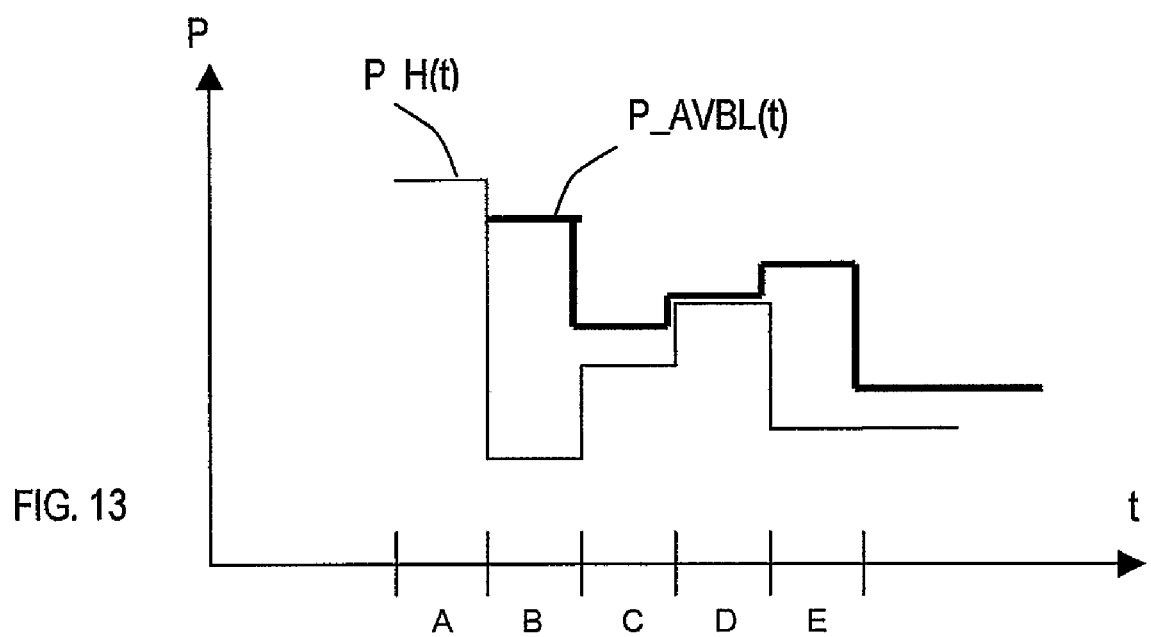

In FIG. 12, $P\_REM(t)$ and $P\_PERM(t)$ have been shown. FIG. 13 shows, $P\_AVBL(t)$ as defined in step 6.

For each scheduling interval, the scheduler schedules data at a power level lower or equal to the power level defined by $P\_AVBL(t)$, depending on whether enough HSPDA data is at hand.

Figure 14:
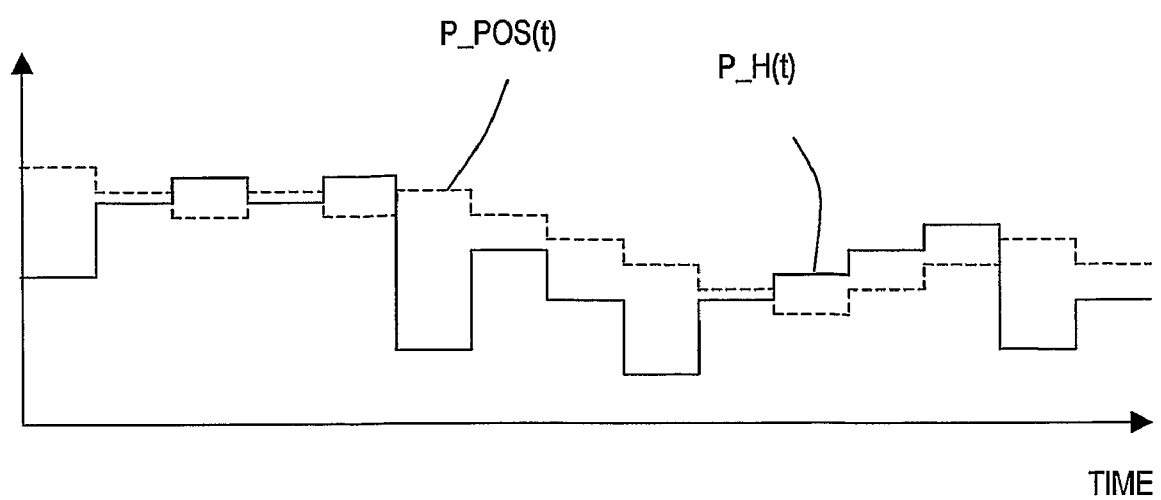
FIG. 14, shows another exemplary scenario and the effects of the invention for given in-put data.
Figure 1:
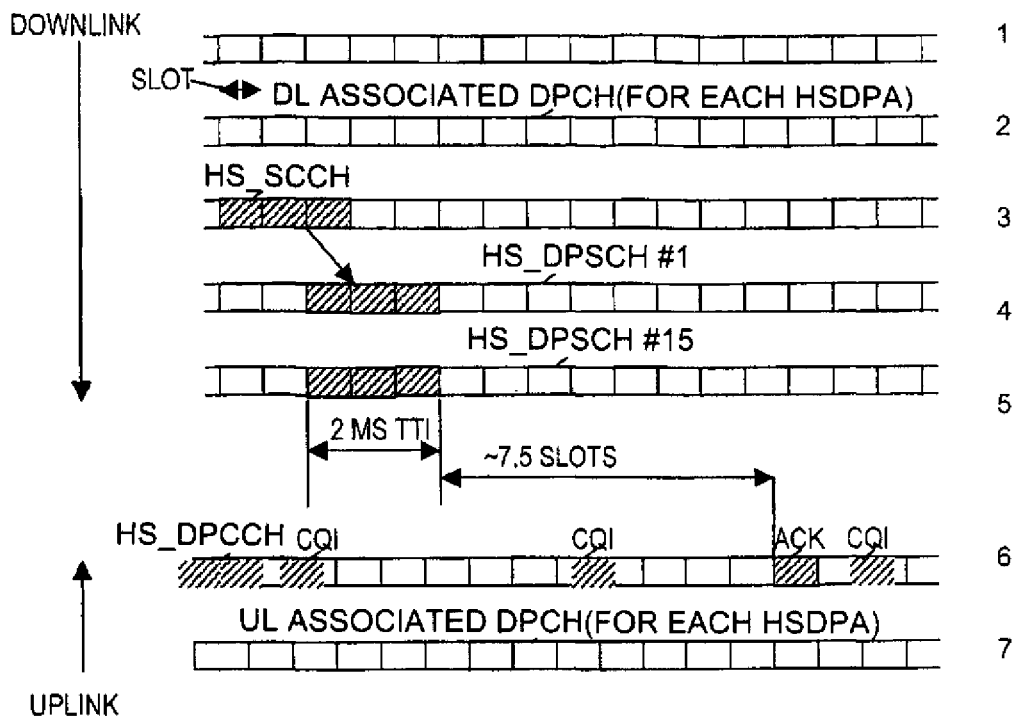

In FIG. 14, another exemplary scenario has been shown for given input data in which the used HSPDA power $P\_H(t)$ and the possible power $P\_POS(t)$ are shown over time using the method described above.

As appears, the measure P_POS caters for that the HSPDA transmission has such a low power build up-phase that the power loops of dedicated channels match the increase. It also indicates that a relative high level of HSPDA power is used after interruptions in HSPDA traffic.

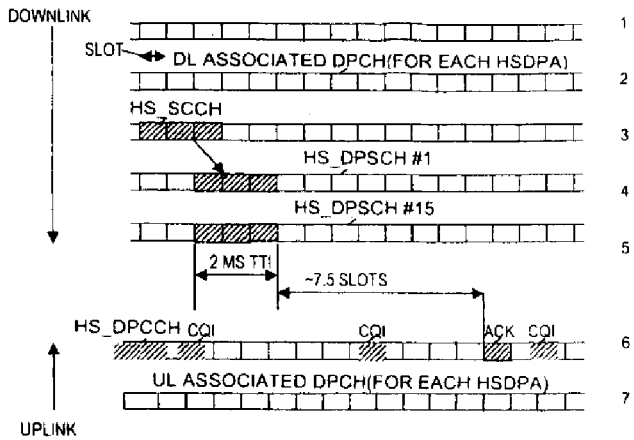

The invention claimed is:

1. A transmission unit, comprising:
a first unit receiving scheduled first data for transmission on at least a first channel:
a power control unit for the first channel responsive to a respective closed loop power regulation signal under which at least the transmit power rate of change is limited to a predetermined value per time unit;

a packet data scheduler scheduling second data packets for transmission on at least a second channel at an actual power level; and, a power amplifier amplifying and outputting the scheduled first and second data, wherein the outputted first and second channels are subject to interference from one another, and wherein the packet data scheduler is operative to:

receive the first scheduled data;

determine a possible power at a given instance as the maximum value of either the actual power at a previous instance or the possible power determined at a previous instance, decreasing the maximum value by a predetermined value (d); and, determine a permitted power at a given instance as the maximum value of either the actual power of a previous instance added with the predetermined value (d) or the determined possible power.

2. The transmission unit according to claim 1, wherein the packet data scheduler is further operative to, as a function of the available second data to be transmitted, schedule the second data at a power level lower or equal to at least the permitted power.

3. The transmission unit according to claim 1, wherein the packet data scheduler is further operative to:

determine a remaining power as the total power budget remaining for high speed packet data transmission after scheduling of common and dedicated channels;

determine an available power as the minimum value of either the permitted power or the remaining power; and, determine a remaining power as the total power budget remaining for high-speed packet data transmission after scheduling of common and dedicated channels.

4. The transmission unit according to claim 3, wherein the packet data scheduler is further operative to, as a function of the available second data to be transmitted, schedule the second data at a power level lower or equal to at least the available power.

5. The transmission unit according to claim 1, wherein the first and second channels are coded using code division multiplex access (ODMA) coding.

6. The transmission unit according to claim 5, wherein the second data packets are high-speed data rate packets (HSPDA).

7. A method of scheduling and transmitting data packets to user entities, wherein channels are subject to interference from one another comprising the steps of: receiving first scheduled data (pertaining to at least a dedicated channel); determining a possible power at a given instance as the maximum value of either the actual power at a previous instance or the possible power determined at a previous instance, and decreasing the maximum value by a predetermined value (d); determining a permitted power at a given instance as the maximum value of either the actual power of a previous instance added with the predetermined value (d) or the determined possible power; and, scheduling and transmitting packet data on at least a second channel, whereby the actual power is held within at least the permitted power.

* * * * *

UNITED STATES PATENT AND TRADEMARK OFFICE
CERTIFICATE OF CORRECTION

| | |
|---|---|
| PATENT NO. | : 7,627,336 B2 |
| APPLICATION NO. | : 10/596730 |
| DATED | : December 1, 2009 |
| INVENTOR(S) | : Carlsson et al. |

It is certified that error appears in the above-identified patent and that said Letters Patent is hereby corrected as shown below:

The title page showing the illustrative figure should be deleted to be replaced with the attached title page.

On the Title Page, item (57), under "ABSTRACT", in Column 2, Line 9, delete "HSPDA" and insert -- HSDPA --, therefor.

On the Title Page, item (57), under "ABSTRACT", in Column 2, Line 15, delete "(P_HS(t-1))" and insert -- (P_H(t-1)) --, therefor.

On the Title Page, item (57), under "ABSTRACT", in Column 2, Lines 20-21, delete "(P_HS(t-1))" and insert -- (P_H(t-1)) --, therefor.

On the Title Page, in the Drawing, for Tag "2", delete "HSPDA" and insert -- HSDPA --, therefor.

On the Title Page, in the Drawing, for Tag "3", delete "HS-SCCH" and insert -- HS_SCCH --, therefor.

On the Title Page, in the Drawing, for Tag "4", delete "HS-DPSCH" and insert -- HS_DPSCH --, therefor.

On the Title Page, in the Drawing, for Tag "5", delete "HS-DPSCH" and insert -- HS_DPSCH --, therefor.

On the Title Page, in the Drawing, for Tag "6", delete "HS-DPCCH" and insert -- HS_DPCCH --, therefor.

On the Title Page, in the Drawing, for Tag "7", delete "HSPDA" and insert -- HSDPA --, therefor.

Signed and Sealed this
Twenty-second Day of March, 2011

David J. Kappos
*Director of the United States Patent and Trademark Office*

CERTIFICATE OF CORRECTION (continued)
U.S. Pat. No. 7,627,336 B2

The drawing sheet, consisting of Fig. 1, should be deleted to be replaced with the drawing sheet, consisting of Fig. 1, as shown on the attached page.

In Fig. 1, Sheet 1 of 8, for Tag "2", delete "HSPDA" and insert -- HSDPA --, therefor.

In Fig. 1, Sheet 1 of 8, for Tag "3", delete "HS-SCCH" and insert -- HS_SCCH --, therefor.

In Fig. 1, Sheet 1 of 8, for Tag "4", delete "HS-DPSCH" and insert -- HS_DPSCH --, therefor.

In Fig. 1, Sheet 1 of 8, for Tag "5", delete "HS-DPSCH" and insert -- HS_DPSCH --, therefor.

In Fig. 1, Sheet 1 of 8, for Tag "6", delete "HS-DPCCH" and insert -- HS_DPCCH --, therefor.

In Fig. 1, Sheet 1 of 8, for Tag "7", delete "HSPDA" and insert -- HSDPA --, therefor.

Figure 2:
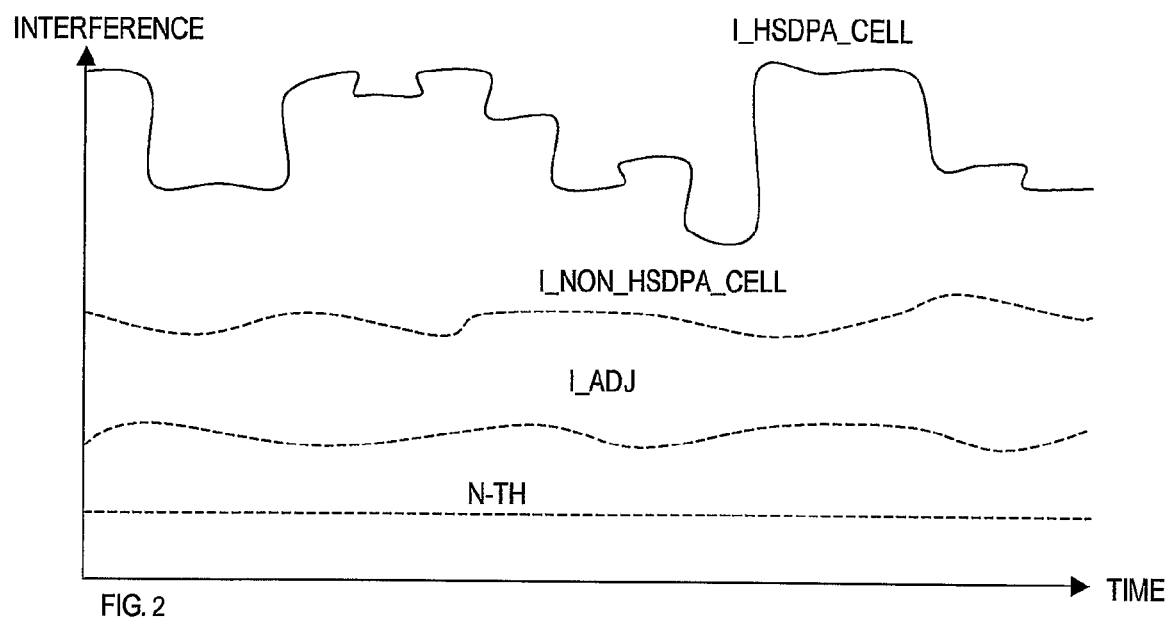
FIG. 2 shows an exemplary scenario for the downlink interference level for a user entity.
Figure 3:
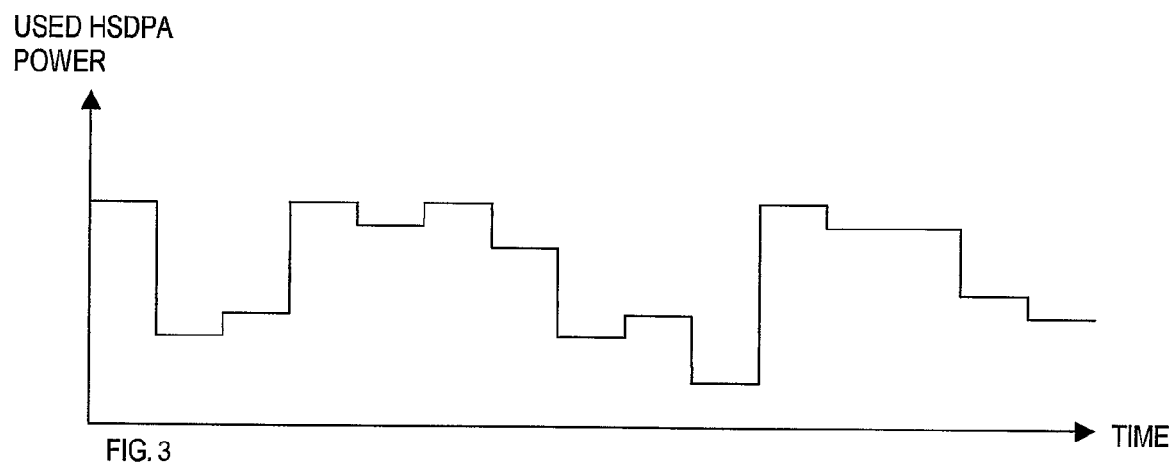
FIG. 3 shows the HSPDA transmission of FIG. 1 corresponding to the used HSPDA power further, FIG. 4 discloses the interference contributions of FIG. 2 for an unregulated HSPDA transmission, FIG. 5 discloses an exemplary embodiment of the transmission unit according to the invention.
Figure 4:
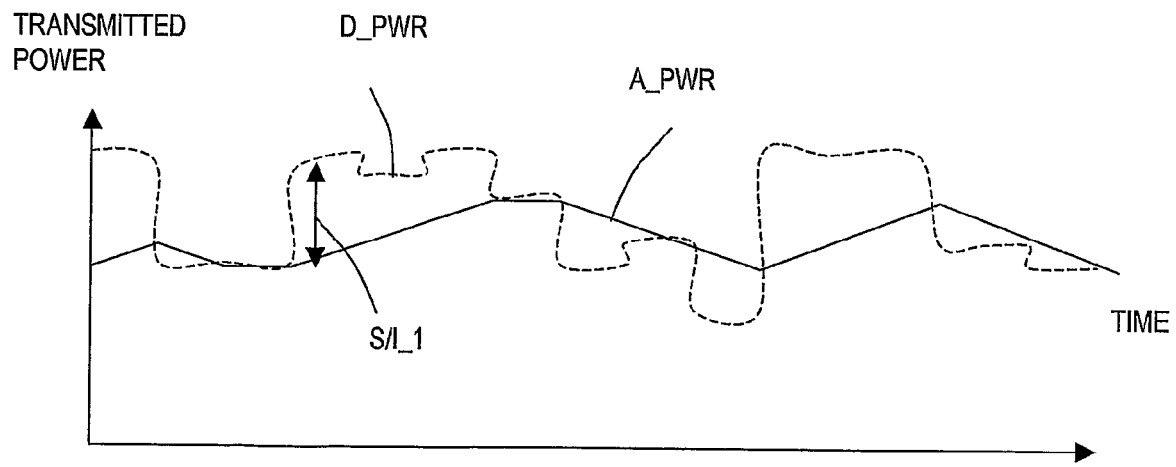

In Fig. 2, Sheet 2 of 8, delete "N-TH" and insert -- N_TH --, therefor.

In Fig. 5, Sheet 3 of 8, delete "HS-PDSCH" and insert -- HS_PDSCH --, therefor.

In Fig. 5, Sheet 3 of 8, delete "HS-SCCH" and insert -- HS_SCCH --, therefor.

In Fig. 5, Sheet 3 of 8, delete "POWER AMP" and insert -- POWER_AMP --, therefor.

In Fig. 5, Sheet 3 of 8, delete "PWR CTRL" and insert -- PWR_CTRL --, therefor.

In Fig. 5, Sheet 3 of 8, delete "TCP CMD" and insert -- TCP_CMD --, therefor.

In Fig. 7, Sheet 4 of 8, delete "HS-SCCH" and insert -- HS_SCCH --, therefor.

In Fig. 7, Sheet 4 of 8, delete "HS-PDSCH" and insert -- HS_PDSCH --, therefor.

In Fig. 8, Sheet 5 of 8, delete "SCHDEDULE" and insert -- SCHEDULE --, therefor.

In Fig. 9, Sheet 6 of 8, delete "P H(t)" and insert -- P_H(t) --, therefor.

In Fig. 10, Sheet 6 of 8, delete "P H(t)" and insert -- P_H(t) --, therefor.

In Fig. 11, Sheet 6 of 8, delete "P H(t)" and insert -- P_H(t) --, therefor.

In Fig. 12, Sheet 7 of 8, delete "P H(t)" and insert -- P_H(t) --, therefor.

In Fig. 13, Sheet 7 of 8, delete "P H(t)" and insert -- P_H(t) --, therefor.

In Column 1, Line 10, delete "packet" before "downlink".

CERTIFICATE OF CORRECTION (continued)

In Column 1, Line 11, delete "(HSPDA)." and insert -- (HSDPA). --, therefor.

In Column 2, Line 37, delete "HSPDA)"," and insert -- (HSDPA)", --, therefor.

In Column 2, Line 38, delete "HSPDA" and insert -- HSDPA --, therefor.

In Column 2, Line 48, delete "HSPDA." and insert -- HSDPA. --, therefor.

In Column 2, Line 51, delete "HSPDA" and insert -- HSDPA --, therefor.

In Column 2, Line 53, delete "HSPDA" and insert -- HSDPA --, therefor.

In Column 2, Line 56, delete "HSPDA" and insert -- HSDPA --, therefor.

In Column 2, Line 57, delete "HSPDA" and insert -- HSDPA --, therefor.

In Column 2, Line 66, delete "HSPDA" and insert -- HSDPA --, therefor.

In Column 3, Line 5, delete "non-HSPDA" and insert -- non-HSDPA --, therefor.

In Column 3, Line 7, delete "NON_HSPDA" and insert -- NON_HSDPA --, therefor.

In Column 3, Line 11, delete "HSPDA" and insert -- HSDPA --, therefor.

In Column 3, Line 12, delete "I_HSPDA" and insert -- I_HSDPA --, therefor.

In Column 3, Line 16, delete "the HSPDA" and insert -- the HSDPA --, therefor.

In Column 3, Line 17, after "used" delete "HSPDA" and insert -- HSDPA --, therefor.

In Column 3, Line 20, delete "HSPDA" and insert -- HSDPA --, therefor.

In Column 3, Line 33, delete "throughput" and insert -- throughput. --, therefor.

In Column 3, Line 38, delete "HSPDA" and insert -- HSDPA --, therefor.

In Column 3, Line 49, delete "HSPDA," and insert -- HSDPA, --, therefor.

In Column 3, Line 52, after "the" delete "HSPDA" and insert -- HSDPA --, therefor.

In Column 3, Line 53, after "used" delete "HSPDA" and insert -- HSDPA --, therefor.

In Column 3, Line 55, delete "HSPDA" and insert -- HSDPA --, therefor.

CERTIFICATE OF CORRECTION (continued)
U.S. Pat. No. 7,627,336 B2

In Column 4, Line 2, delete "in-put" and insert -- input --, therefor.

In Column 4, Line 8, delete "HSPDA" and insert -- HSDPA --, therefor.

In Column 4, Line 12, delete "non-HSPDA" and insert -- non-HSDPA --, therefor.

In Column 4, Line 19, delete "dB/0,67" and insert -- dB/0.67 --, therefor.

In Column 4, Line 61, delete "POWER AMP," and insert -- POWER_AMP, --, therefor.

In Column 5, Line 16, delete "HSPDA" and insert -- HSDPA --, therefor.

In Column 5, Line 17, delete "The HSPDA" and insert -- The HSDPA --, therefor.

In Column 5, Line 17, after "schedules" delete "HSPDA" and insert -- HSDPA --, therefor.

In Column 5, Line 21, delete "HSPDA" and insert -- HSDPA --, therefor.

In Column 5, Line 23, delete "HSPDA" and insert -- HSDPA --, therefor.

In Column 5, Line 31, delete "HSPDA" and insert -- HSDPA --, therefor.

In Column 5, Line 32, delete "DATAl," and insert -- DATA1, --, therefor.

In Column 5, Line 33, delete "HSPDA" and insert -- HSDPA --, therefor.

In Column 5, Lines 33-34, delete "HS_SCH DR" and insert -- HS_SCHDR --, therefor.

In Column 5, Line 34, delete "HSPDA" and insert -- HSDPA --, therefor.

In Column 5, Line 51, delete "(P_HS(t-1))" and insert -- (P_H(t-1)) --, therefor.

In Column 5, Line 57, delete "(P_HS(t-1))" and insert -- (P_H(t-1)) --, therefor.

In Column 6, Line 3, delete "HSPDA" and insert -- HSDPA --, therefor.

In Column 6, Line 18, delete "HSPDA" and insert -- HSDPA --, therefor.

In Column 6, Line 19, delete "HSPDA" and insert -- HSDPA --, therefor.

In Column 6, Line 21, delete "HSPDA" and insert -- HSDPA --, therefor.

In Column 6, Line 32, delete "HSPDA" and insert -- HSDPA --, therefor.

CERTIFICATE OF CORRECTION (continued)
U.S. Pat. No. 7,627,336 B2

In Column 6, Line 35, delete "HSPDA" and insert -- HSDPA --, therefor.

In Column 6, Line 41, delete "P_Perm" and insert -- P_PERM --, therefor.

In Column 6, Line 48, delete "HSPDA" and insert -- HSDPA --, therefor.

In Column 6, Line 51, delete "HSPDA" and insert -- HSDPA --, therefor.

In Column 6, Line 54, delete "P_POS" and insert -- P_POS(t) --, therefor.

In Column 6, Line 54, delete "HSPDA" and insert -- HSDPA --, therefor.

In Column 6, Line 57, delete "HSPDA" and insert -- HSDPA --, therefor.

In Column 6, Line 58, delete "HSPDA" and insert -- HSDPA --, therefor.

In Column 8, Line 11, in Claim 5, delete "(ODMA)" and insert -- (CDMA) --, therefor.

In Column 8, Line 14, in Claim 6, delete "(HSPDA)." and insert -- (HSDPA). --, therefor.

(12) United States Patent
Carlsson et al.

(10) Patent No.: US 7,627,336 B2
(45) Date of Patent: Dec. 1, 2009

(54) POWER CONTROL FOR HIGH SPEED PACKET DATA TRANSMISSION

(75) Inventors: Roland Carlsson, Ojersjo (SE); Torbjorn Karlsson, Lindome (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 693 days.

(21) Appl. No.: 10/596,730

(22) PCT Filed: Dec. 22, 2003

(86) PCT No.: PCT/SE03/02053

§ 371 (c)(1),
(2), (4) Date: Jun. 22, 2006

(87) PCT Pub. No.: WO2005/062489

PCT Pub. Date: Jul. 7, 2005

(65) Prior Publication Data

US 2007/0111745 A1    May 17, 2007

(51) Int. Cl.
H04B 7/00 (2006.01)
H04B 1/00 (2006.01)
H04B 7/185 (2006.01)

(52) U.S. Cl. .................... 455/522; 455/69; 370/318
(58) Field of Classification Search .............. 455/522, 455/69; 370/318
See application file for complete search history.

(56) References Cited

U.S. PATENT DOCUMENTS

| | | | | |
|---|---|---|---|---|
| 5,924,043 | A * | 7/1999 | Takano | 455/522 |
| 5,982,760 | A * | 11/1999 | Chen | 370/335 |
| 6,628,924 | B1 * | 9/2003 | Miyamoto | 455/69 |

(Continued)

FOREIGN PATENT DOCUMENTS

EP    1351411 A1    10/2003

(Continued)

OTHER PUBLICATIONS

Swedish Patent Office, International Search Report for PCT/SE2003/002053, dated Jul. 16, 2004.

*Primary Examiner*—Matthew D Anderson
*Assistant Examiner*—Bobbak Safaipour
(74) *Attorney, Agent, or Firm*—Roger S. Burleigh

(57) ABSTRACT

A transmitting unit comprising a first unit (CM_SCHDR) receiving scheduled first data (DATA2, DATA3) for transmission on at least a first channel, a power control unit (PWR_CTRL) for the first channel responsive to a respective closed loop power regulation signal (TCP_CMD), under which at least the transmit power rate of change is limited to a predetermined value per time unit, a packet data scheduler (HS_SCHDR) scheduling second data packets (DATA1), such as HSPDA data, for transmission on at least a second channel at an actual power level ($P\_H(t)$), and a power amplifier (POWER_AMP) amplifying and outputting the scheduled first and second data, whereby the outputted first and second channels are subject to interference from one another, is shown. A possible power ($P\_POS(t)$) is determined at a given instance as the maximum value of either the actual power ($P\_HS(t-1)$) at a previous instance or the possible power determined at a previous instance ($P\_POS(t-1)$), decreasing the maximum value by a predetermined value (d). Moreover, a permitted power ($P\_PERM(t)$) at a given instance as the maximum value of either the actual power of a previous instance ($P\_HS(t-1)$) added with the predetermined value (d) or the determined possible power ($P\_POS(t)$). Finally, the scheduling is performed within these limits.

7 Claims, 8 Drawing Sheets